US009499391B1

(12) United States Patent
Douglas

(10) Patent No.: US 9,499,391 B1
(45) Date of Patent: Nov. 22, 2016

(54) MULTI-PURPOSE UTILITY CADDY

(71) Applicant: Reginald M. Douglas, Buffalo, NY (US)

(72) Inventor: Reginald M. Douglas, Buffalo, NY (US)

( * ) Notice: Subject to any disclaimer, the term of this patent is extended or adjusted under 35 U.S.C. 154(b) by 0 days.

(21) Appl. No.: 14/793,343

(22) Filed: Jul. 7, 2015

(51) Int. Cl.
*B67D 7/84* (2010.01)
*B62B 3/00* (2006.01)
*B62B 5/00* (2006.01)
*B67D 7/60* (2010.01)
*B62B 5/06* (2006.01)

(52) U.S. Cl.
CPC ............... *B67D 7/845* (2013.01); *B62B 3/007* (2013.01); *B62B 5/00* (2013.01); *B67D 7/60* (2013.01); *B62B 5/06* (2013.01); *B62B 2202/50* (2013.01)

(58) Field of Classification Search
CPC ........ B67D 7/845; B67D 7/60; B62B 3/007; B62B 5/00; B62B 5/06; B62B 2202/50
See application file for complete search history.

(56) References Cited

U.S. PATENT DOCUMENTS

| | | | | |
|---|---|---|---|---|
| 1,786,431 A * | 12/1930 | Kegler | ................ | A01M 7/0035 222/130 |
| 4,863,075 A * | 9/1989 | Romer | ...................... | A45F 3/46 108/19 |
| D344,383 S | 2/1994 | Ek | | |
| 6,823,998 B2 | 11/2004 | Fabregas | | |
| 7,168,714 B2 | 1/2007 | Gibbs | | |
| 7,455,246 B2 * | 11/2008 | Roth | ....................... | B08B 3/026 222/609 |
| 8,690,028 B2 * | 4/2014 | Risheq | ..................... | C02F 1/003 222/158 |
| 2005/0011037 A1 * | 1/2005 | Zhao | ....................... | A47L 9/009 15/323 |
| 2013/0168420 A1 * | 7/2013 | Kern | ...................... | B67D 7/845 222/608 |

* cited by examiner

*Primary Examiner* — Frederick C Nicolas
(74) *Attorney, Agent, or Firm* — Vincent G. LoTempio; Kloss, Stenger & LoTempio; David T. Stephenson

(57) ABSTRACT

A multi-purpose utility caddy can be manipulated for dispensing a fluid trough a pumping mechanism, while holding and organizing at least one item. The caddy comprises a mobile housing for storing, organizing, and protecting the at least one item and a fluid. A mobile portion that enables transport of the housing. A lever extends from the housing to enable manipulation of the housing. Multiple compartments and mounting members are used to hold the items. Lids hingedly regulate access to the compartments. The lids include slots and depressions for holding additional items. A fluid compartment contains a fluid that is dispensed directly from the housing through a pumping action. A pump handle enables a pumping action to generate air pressure inside the fluid compartment. A sealing member seals the fluid compartment to restrict air loss. A fluid discharge tube carries the pressurized fluid from the fluid compartment for directional dispensing.

20 Claims, 8 Drawing Sheets

MULTI-PURPOSE UTILITY CADDY

FIELD OF THE INVENTION

The present invention relates generally to a multi-purpose utility caddy. More so, a multi-purpose utility caddy provides a mobile container that can be manipulated for dispensing a fluid through a pumping mechanism, while simultaneously holding, storing, and organizing at least one item.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that proper maintenance of lawns and gardens requires numerous gardening tools, liquids, and fertilizers. One problem with lawn work is the need to store and transport the implements and materials needed to properly work on the lawn or garden. The variety of shapes and sizes of the implements needed or useful for working on lawns and gardens makes them difficult to store and carry. The chemical compositions and water are also in liquid form, and thereby re quire special mechanisms for storage and dispensing onto the lawn.

Although many people have areas of the garage or a storage shed set aside or adapted for storing their lawn and garden implements, these implements still tend to be haphazardly stored. For instance, it is common to merely store the long and short handled tools in one of the open containers and/or a wheel barrow or to hang them on various hooks placed on walls in the storage area. These storage solutions for lawn and garden care implements have problems with being able to safely and effectively store without damaging the implements and/or other items in the storage area. In addition, once they are carried to the work site the long and short handled tools must be emptied onto the ground so that the container can be used, which then makes the container unusable for moving the implements to a new location.

Another often tried solution is to loosely carry a number of different sized and shaped lawn and garden care implements to the work site where they are needed. This presents significant difficulty for most people. As a result, the typical lawn care worker will only carry a few selected implements at one time and either make an educated guess which implements will be needed or make several trips to carry all those that may be needed.

It is also known that lawn and garden work is generally not done in a single, fixed location. For instance, the typical lawn care worker will at least need to move around the lawn or garden of a single home, business or other location and, in the case of professional lawn care workers, will need to move from one lawn to another. Mobility that utilizes power sources presents yet additional problems, as replenishing a battery or locating a power source can be problematic near a lawn.

It is known that a conventional wheelbarrow includes an open cavity for temporarily supporting and transporting dirt, gardening tools and supplies, building materials, and refuse. Conventional wheelbarrows, however, are inherently unstable and prone to tipping on uneven terrain. Accordingly, the wheelbarrow is not well suited for supporting and transporting large, heavy or awkward lawn care appliances, such as rakes, bags, and chemical dispensers. As a result, accidents and spillage may occur.

Other proposals have involved lawn care carts for transporting tools and liquids. The problem with these lawn care devices is that they do not provide sufficient storage space for the myriad items that might be used while performing lawn care. Also, the mobility of the wagons requires a power source or is not easy to maneuver. Even though the above cited garden tool and liquid transport carts meet some of the needs of the market, a multi-purpose utility caddy that can be pushed, pulled, and manipulated while simultaneously dispensing a fluid trough a pumping mechanism, and holding various types of items is still desired.

SUMMARY OF THE INVENTION

The present invention is directed to a multi-purpose utility caddy that can be manipulated for dispensing a fluid trough a pumping mechanism, while simultaneously holding, storing, and organizing at least one item. The multi-purpose utility caddy, hereafter, "caddy", may be used for myriad utilities, including, without limitation, lawn care, construction, pest control, military operations, painting, and as a toy for children. The caddy is adaptable so that it can be used for different functions with minimal reconfiguration.

In some embodiments, the caddy comprises a housing. The caddy includes multiple compartments and mounting members for storing and holding at least one item. The compartments are organized towards a front end and a rear end of the housing. A lid regulates access to the compartment. The lid may include a lid slot and a lid depression for retaining the item. The item is generally related to the function of the caddy at the time. For example, a rake is carried in the at least one slot while performing lawn work, and a shovel is carried in a front compartment for use during construction work. The housing further includes at least one mounting member that is configured to grip the at least one item, such as an elongated handle.

The housing is mobile, such that it can be transported for operation in multiple areas. The housing includes a mobile portion that enables transport on a ground surface. The mobile portion may include, without limitation, a wheel and axle, rails, sleds, and rollers. A lever extends from the caddy to enable manipulation of the housing. For example, the lever may be grasped, pushed, and pulled to move the housing to a desired location and orientation. The caddy is thus, manipulated manually without requiring a power source.

In some embodiments, a fluid compartment contains a fluid that is dispensed directly from the housing. The pumping mechanism requires a manual pumping action to dispense the fluid. In one exemplary embodiment, a pump handle is manipulated in an up and down pumping action to generate air pressure inside the fluid compartment. A sealing member helps seals a pump tube in the fluid compartment to inhibit escape of air from inside the fluid compartment for optimal pumping of the fluid. A fluid discharge tube carries the pressurized fluid from the fluid compartment through a dispensing head for directional dispensing. The fluid may include, without limitation, water, pesticide, fertilizer, gel, paint, and a chemical composition.

It is one objective of the present invention to provide a caddy that can be used for multiple utilities, such as lawn care, construction, and pest control with minimal reconfiguration to the caddy.

It is another objective to enable facilitated carrying of tools for a project.

It is another objective to manually manipulate the housing without requiring a power source.

Yet another objective is to provide variously sized and dimensioned slots and depressions configured to hold correspondingly shaped items.

Yet another objective is to safely store a fluid inside a fluid compartment in the housing.

Yet another objective is to utilize air pressure through a pumping action to dispense the fluid.

Yet another objective is to provide a flexible fluid discharge tube for directional dispensing of the fluid.

Yet another objective is to provide an inexpensive to manufacture caddy that is easy to use and transport.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 4A illustrates a top view of the multi-purpose utility caddy, and FIG. 4B illustrates the section taken along section A-A of FIG. 4A, detailing an exemplary fluid compartment filled with a fluid, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1-8 illustrate a multi-purpose utility caddy 100 that holds, stores, and organizes at least one item 200a-d and a fluid 142 for a variety of utilities. The multi-purpose utility caddy 100, hereafter, "caddy 100", securely retains and orients the at least one item 200a-d for efficient storage and facilitated access. Caddy 100 is also configured to safely store and transport the fluid 142 until fluid 142 is ready to be dispensed through a manual pump action mechanism. Caddy 100 utilizes manual means for maneuvering and transport, and thereby does not utilize a power source. Caddy 100 may be used for myriad utilities, including, without limitation, lawn care, construction, pest control, painting, military operations, and as a toy for children. Caddy 100 is adaptable so that it can be used for multiple utilities with minimal reconfiguration.

In one exemplary use, a rake and a lawn bag can be carried on caddy 100 to a lawn for raking a lawn and storing the leaves in the lawn bag. Caddy 100 may then be used to carry the lawn bag to a land fill for discarding the leaves. In another exemplary embodiment, caddy 100 holds a basket and liquid chlorine. Caddy 100 can be used to transport the basket and liquid chlorine to a swimming pool. The basket may then be used to remove plant residue from the pool for cleaning the surface of the water, and the liquid chlorine may be dispensed into the swimming pool for purifying the water.

Figure 1:
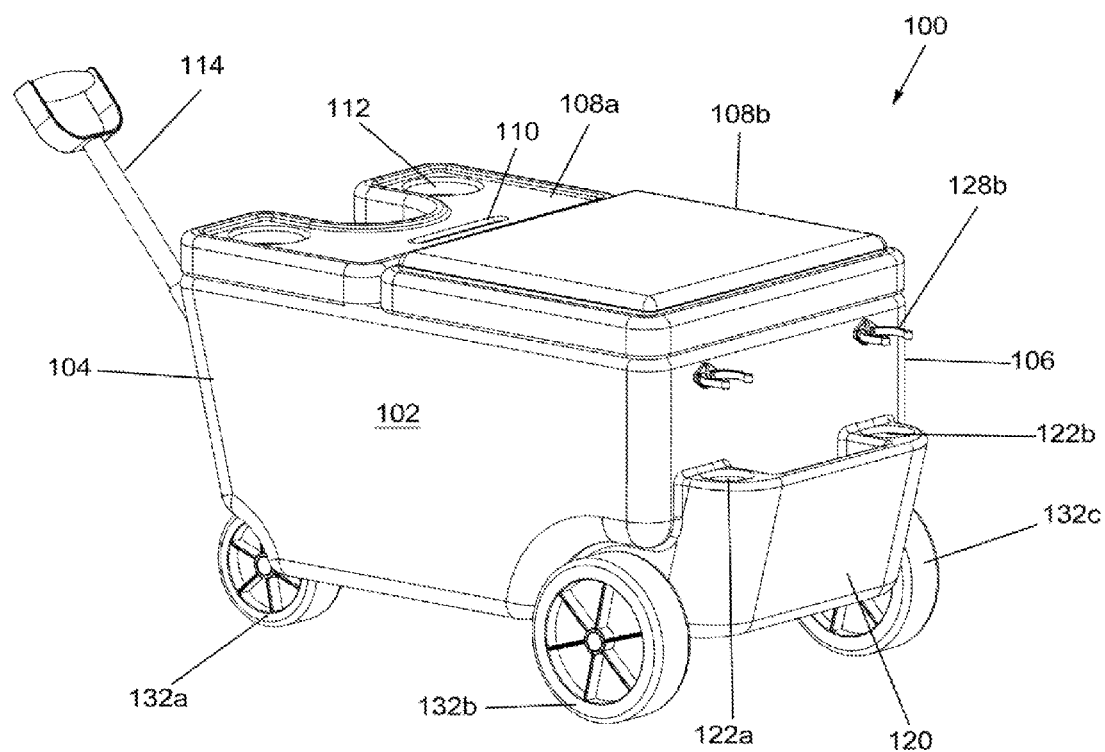
FIG. 1 illustrates a rear perspective view of an exemplary multi-purpose utility caddy with exemplary lids in a closed position, in accordance with an embodiment of the present invention.

As illustrated in FIG. 1, a housing 102 forms a generally rectangular shape and is sized and dimensioned for transport storage of at least one item 200a-d and a fluid 142. However, housing 102 may be shaped in any number of shapes, including, a cube, a sphere, a plane, and a pyramid. Housing is 102 defined by at least one front compartment 116a-b and at least one rear compartment 118. Front compartment 116a-b is in the front end 104 of housing 102, while rear compartment 118 is at rear end 106 of housing 102. In one embodiment, front compartment 116a-b is smaller than rear compartment 118.

Figure 2:
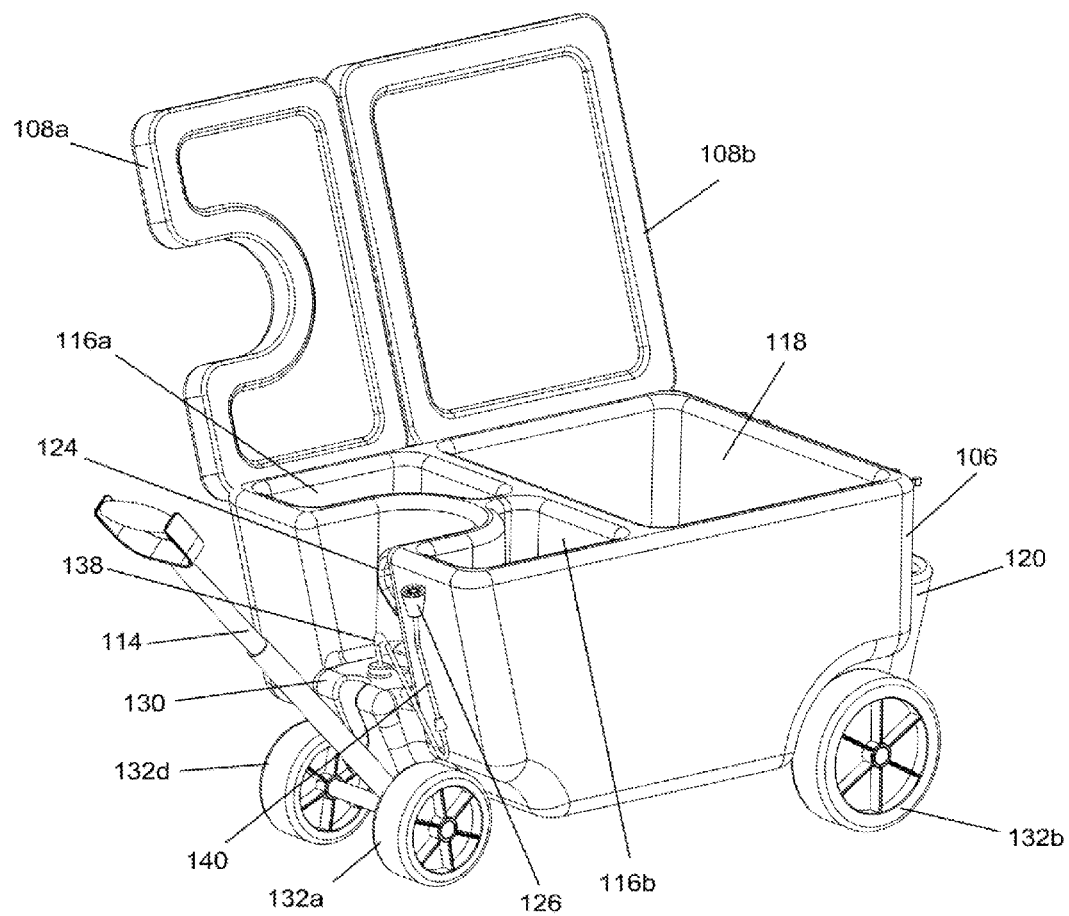
FIG. 2 illustrates a front perspective view of the multi-purpose utility caddy with the lids in an open position, in accordance with an embodiment of the present invention.

Turning now to FIG. 2, housing 102 further includes at least one side compartment 120. Side compartment 120 includes at least one side compartment depression 122a-b that is configured to hold item 200a-d. In one embodiment, side compartment 120 is centrally located at rear end 106 of housing 102, and a pair of circular side compartments are disposed on each end of the central side compartment. In one exemplary embodiment, a rake can partially be placed in the side compartment, extending outwardly from the housing 102. From the side compartment 120, the rake may then be easily accessed and returned for storage, as needed. Additionally, a can of spray paint can be placed in side compartment depression 122*a-b*.

Figure 3:
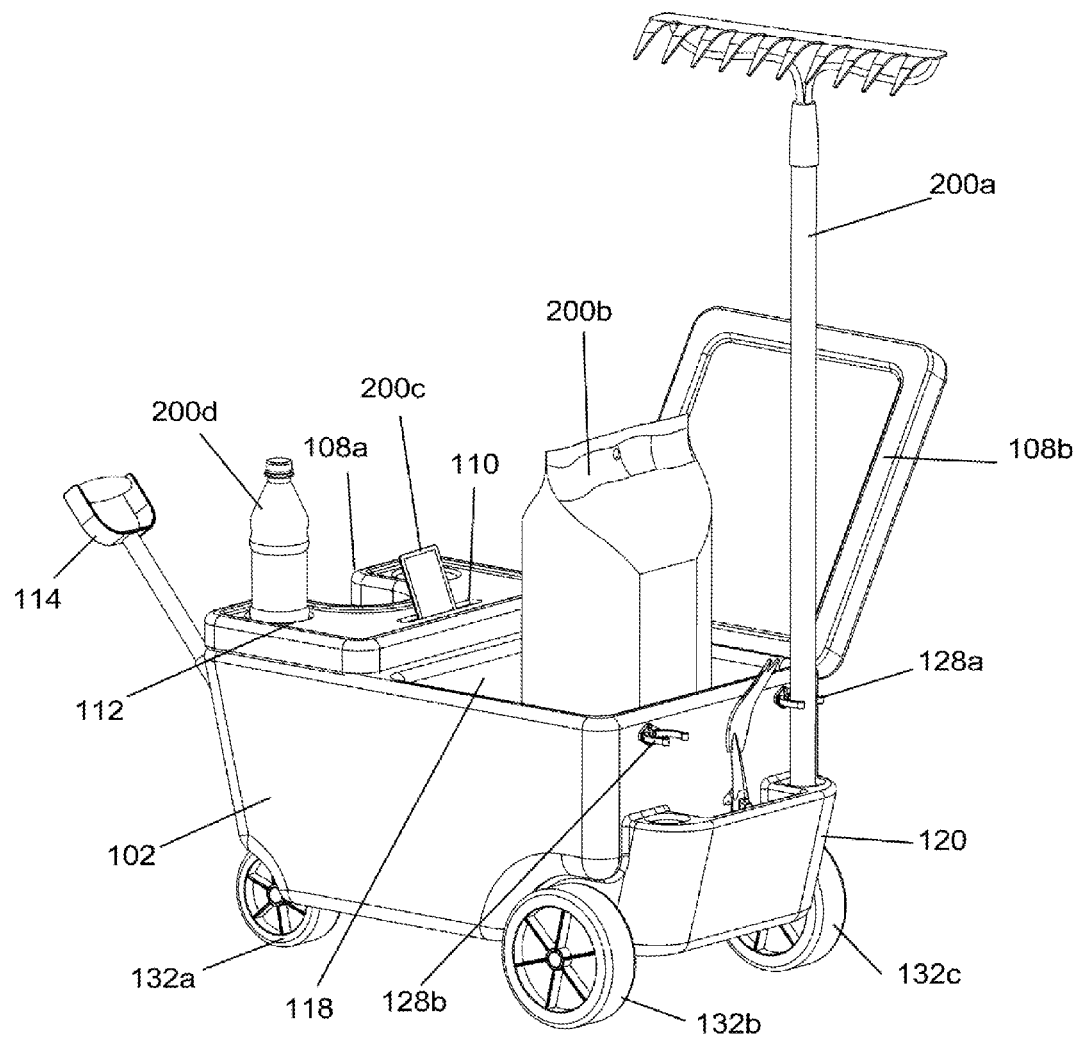
FIG. 3 illustrates a rear perspective view of the multi-purpose utility caddy with the lids in the open position and a front compartment and a rear compartment holding at least one item, in accordance with an embodiment of the present invention.

As shown in FIG. 3, housing 102 further includes at least one mounting member 128*a-b*. At least one mounting member 128*a-b* is disposed to extend out from housing 102. Mounting member 128*a-b* is configured to form a generally U-shaped grip. The generally U-shaped grip may be biased to exert an inward pressure for retaining an elongated item, such as a handle or an elongated tool. In one embodiment, two mounting members position at rear end 106 of housing 102, above rear compartment 118.

Figure 4A:
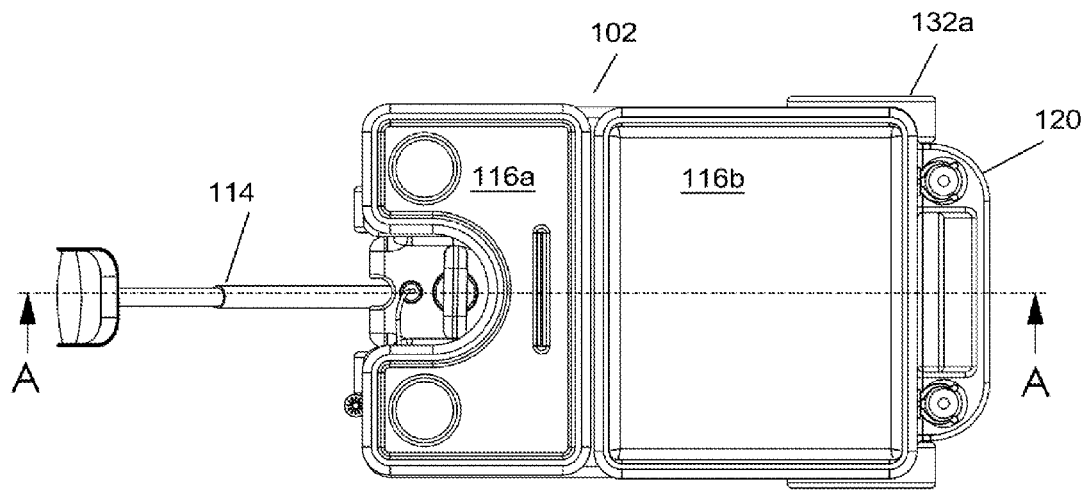
FIGS. 4A and 4B illustrate sectioned views of the multi-purpose utility caddy, where
Figure 4B:
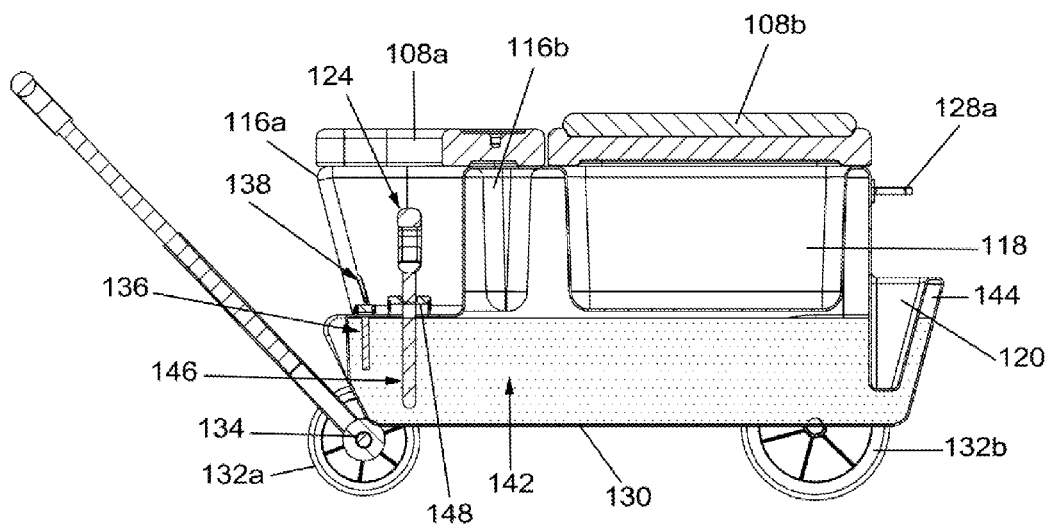

As illustrated in FIGS. 4A and 4B, at least one lid 108*a-b* regulates access to front and rear compartments 116*a-b*, 118. Lid 108*a-b* may hingedly pivot between an open and closed position over respective compartment 116*a-b*, 118. However, in other embodiments, the lid 108*a-b* may slide or completely detach in relation to respective compartment 116*a-b*, 118. The lid 108*a-b* may include a lid slot 110 and a lid depression 112 for retaining the at least one item 200*a-d*. Lid slot 110 and lid depression 112 provide, yet another space for storage of the at least one item 200*a-d*. Lid slot 110 may include an elongated space that is sized and dimensioned to receive a communication device, such as a smart phone. Lid depression 112 may include a circular hole that is sized and dimensioned to receive a container of soda. Item 200*a-d* is generally related to the function of the caddy 100 and the utility or job. For example, a rake is carried in the at least one lid slot while performing lawn work, and a shovel is carried in the at least one front compartment for use during construction work.

Figure 5:
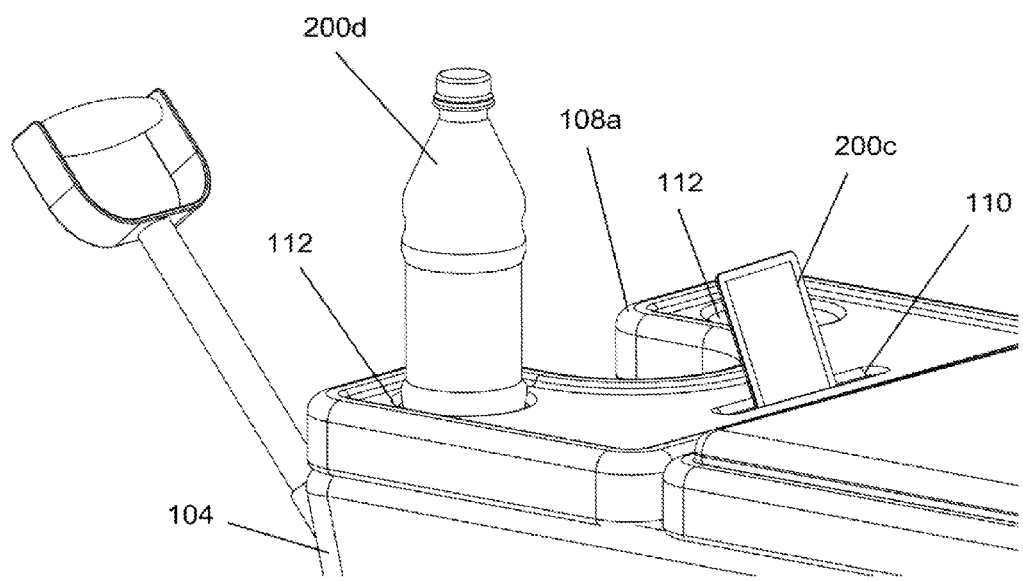
FIG. 5 illustrates a perspective view of an exemplary front lid holding the items, in accordance with an embodiment of the present invention.
Figure 6:
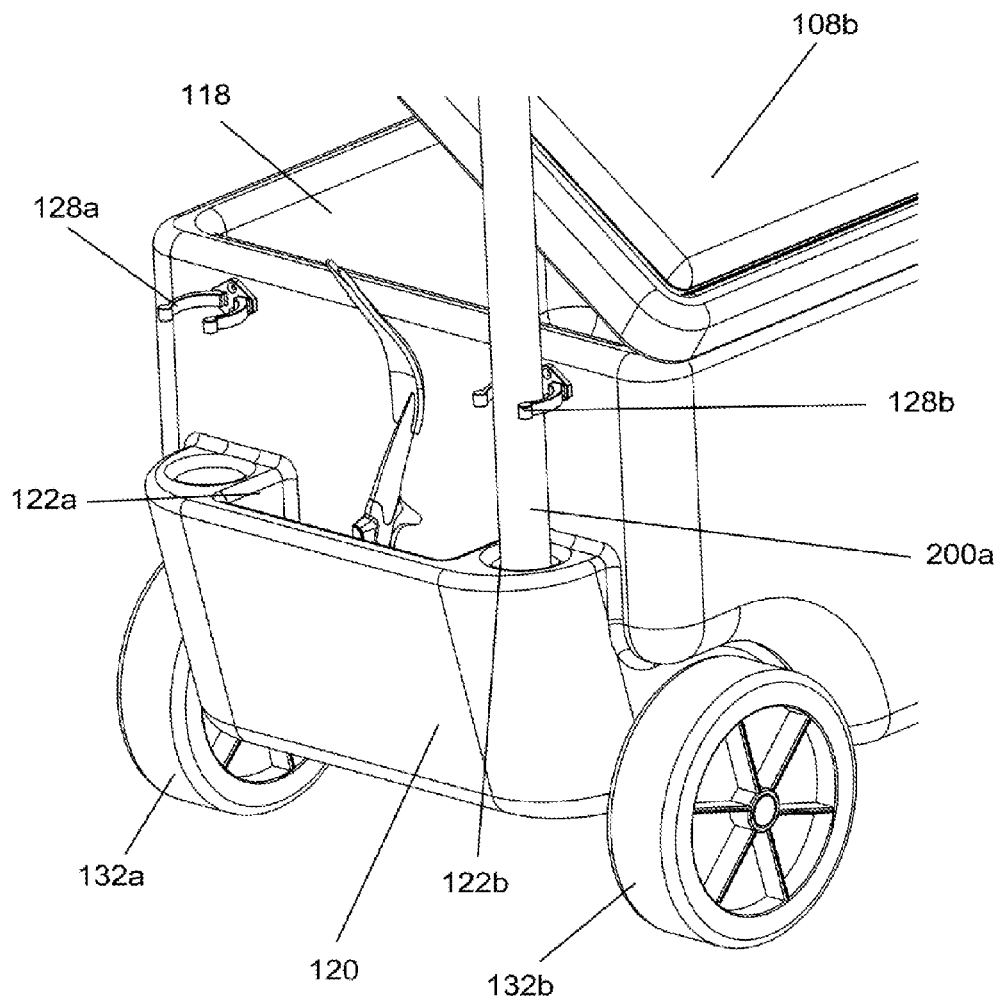
FIG. 6 illustrates a perspective view of an exemplary side compartment holding the items, in accordance with an embodiment of the present invention.

Turning now to FIG. 5, housing 102 is mobile, such that it can be transported for operation in multiple areas. For enabling this mobility, housing 102 includes a mobile portion 132*a-d* that enables transport on a ground surface. Mobile portion 132*a-d* generally positions beneath the housing 102. Mobile portion 132*a-d* may include, without limitation, a wheel and axle 134, rails, sleds, and rollers. In one embodiments, shown in FIG. 6, two wheels are used beneath front end 104 of housing 102, and two wheels are used at the rear end 106 of the housing 102. Wheel and axle 134 may be fixed longitudinally with the housing 102, or may be rotatable, as in a caster wheel.

Figure 7:
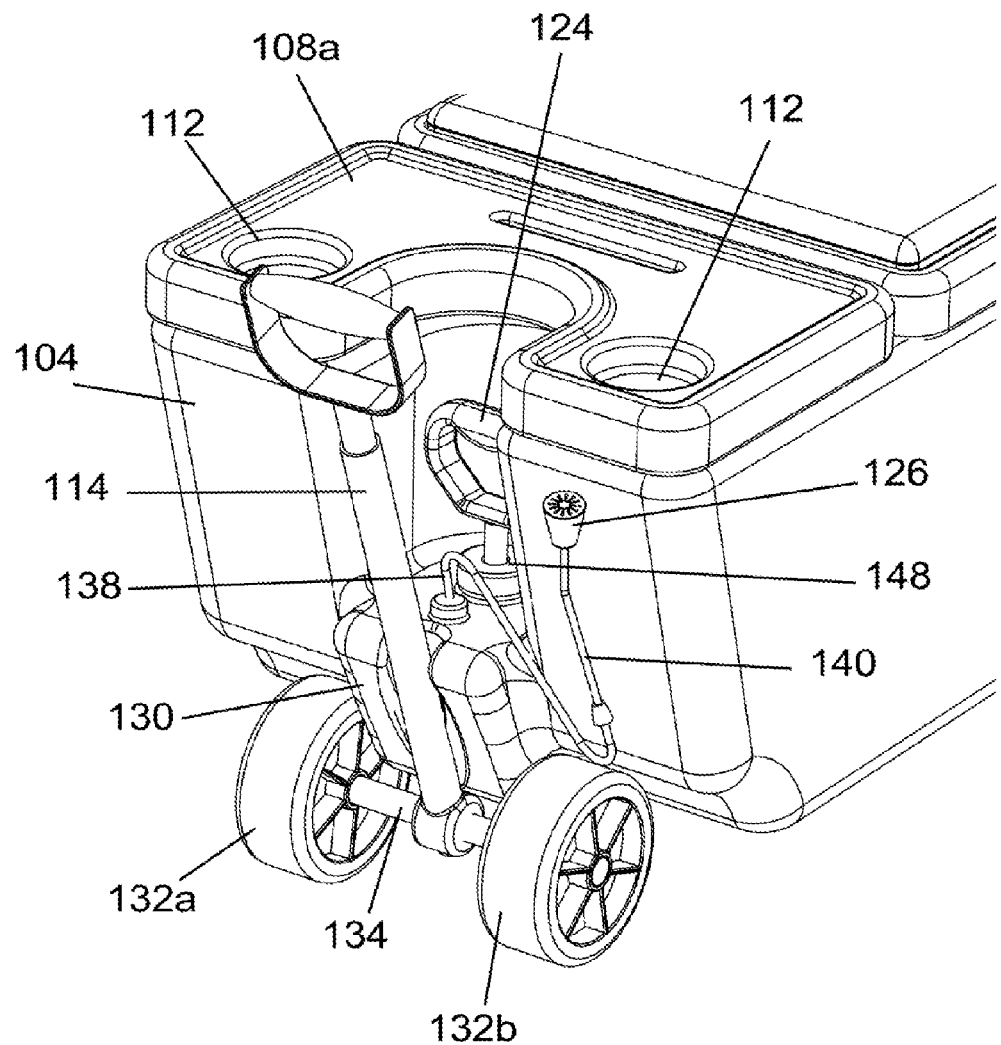
FIG. 7 illustrates a perspective view of an exemplary pump handle, in accordance with an embodiment of the present invention.
Figure 8:
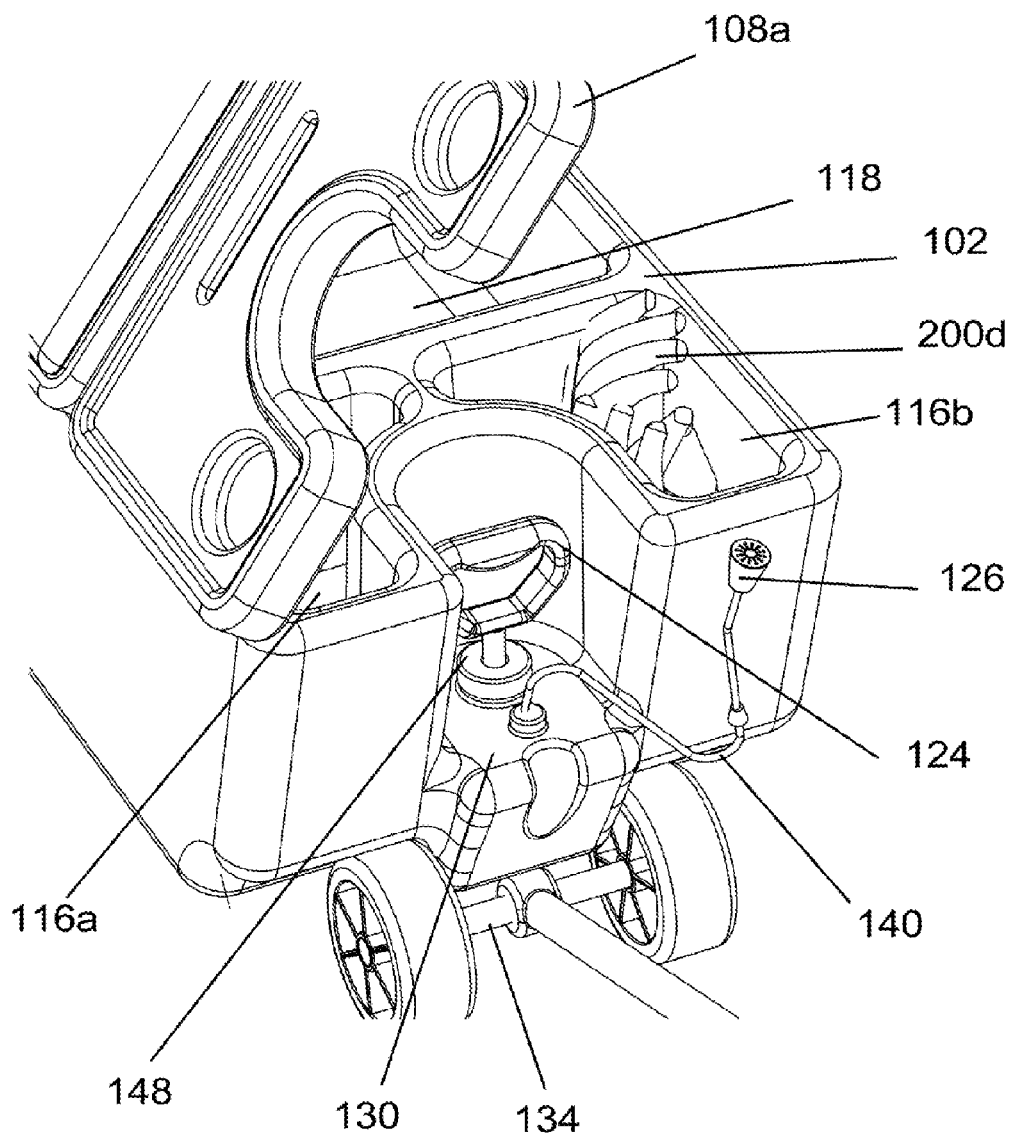
FIG. 8 illustrates a perspective view of an exemplary front compartment with the front lid open, in accordance with an embodiment of the present invention.

As illustrated in FIGS. 7 and 8, a lever 114 extends from the caddy 100 to enable manipulation of the housing 102. Lever 114 is defined by a distal end and a proximal end. The distal end pivots at the intersection of housing 102, so as to provide a lower turning radius and providing storage space. A handle forms at the proximal end of lever 114 to provide a grip. In one exemplary manipulation of lever 114 for moving housing 102, the lever pushes and pulls the housing 102 to a desired location and direction. Lever 114 enables caddy 100 to be manipulated manually without requiring a power source, such as batteries or external power outlets.

Looking back at FIG. 4B, housing 102 comprises a fluid compartment 130 that is disposed beneath the front and rear compartments 118. Fluid compartment 130 is defined by a cavity 144 that holds a fluid 142. Fluid compartment 130 is sealed and segregated so as to safely contain the fluid 142 separately from front and rear compartments 116*a-b*, 118. Fluid 142 is dispensed directly from fluid compartment 130 through a pumping mechanism that generates pressurized air inside cavity 144 of the fluid compartment. The pressurized air dispenses fluid 142. Fluid 142 may include, without limitation, water, pesticide, fertilizer, chlorine, gel, and a chemical composition.

In some embodiments, a pump tube 146 is disposed to extend into the cavity 144 of fluid compartment 130. Pump tube 146 is configured to enable air into cavity 144 of the fluid compartment 130. In this manner, the air generates pressure in cavity 144 of fluid compartment 130. A sealing member 148 is disposed at the junction between pump tube 146 and the fluid compartment 130. Sealing member 148 is configured to help restrict the pressurized air from escaping out of cavity 144 of the fluid compartment 130. The sealed configuration enables pressure to build up inside cavity 144 of the fluid compartment 130. In one embodiment, sealing member 148 is a rubber gasket.

In some embodiments, the air passing through pump tube 146 is generated by manipulating a pump handle 124. Pump handle 124 is disposed to operatively connect to the pump tube 146. Pump handle 124 is configured to enable gripping for performing an up and down pumping motion that forces the air through pump tube 146. The pumping action generates air that is pushed through pump tube 146 and into cavity 144 of fluid compartment 130.

In some embodiments, a tube adapter 138 is disposed to pass through the fluid compartment 130. Tube adapter 138 is configured to help release excess pressurized air from the cavity 144 of fluid compartment 130. Tube adapter 138 serves, essentially as an exhaust for excess air and pressure generated inside cavity 144 of fluid compartment 130.

Looking back at FIG. 2, a fluid discharge tube 140 is configured to enable directional dispensing of fluid 142 and the pressurized air from cavity 144 of fluid compartment 130. The pressurized air in cavity 144 of the fluid compartment forces the fluid 142 through the fluid discharge tube 140. In one embodiment, fluid discharge tube 140 is a flexible, plastic hose.

Fluid discharge tube 140 terminates at a dispensing head 126. Dispensing head 126 tapers outwardly, having at a plurality of openings that enable passage of fluid 142 during dispensing. In some embodiments, dispensing head 126 adjustably allows fluid 142 to be dispensed as a spray, a stream, or a trickle. In some embodiments, a cavity outlet tube 136 is disposed in cavity 144 of the fluid compartment 130. Cavity outlet tube 136 is in communication with cavity 144 of fluid compartment 130, and fluid discharge tube 140. In this manner, the cavity outlet tube feeds fluid 142 and the pressurized air to the fluid discharge tube 140. The diameter of cavity outlet tube 136 is sized to snugly mate with fluid discharge tube 140.

Thus, caddy 100 is efficacious for enabling manual transport to a variety of utilities and jobs, while simultaneously carrying at least one item 200*a-d* and a fluid 142 that are pertinent to the utility or job. Caddy 100 is transported manually on a mobile portion 132*a-d*. The caddy 100 has multiple compartments 116*a-b*, 118 and mounting members 128*a-b* for holding and organizing the item 200*a-d*. At least one lid 108*a-b* regulates access to compartments 116*a-b*, 118, and also includes a lid slot 110 and a lid depression 112 that holds items 200*a-d*. Caddy 100 also dispenses the fluid 142 by manually pressurizing fluid 142 in a fluid compartment and enabling the pressurized air to force the fluid in a desired direction.

These and other advantages of the invention will be further understood and appreciated by those skilled in the art by reference to the following written specification, claims and appended drawings.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A multi-purpose utility caddy for dispensing a fluid trough a pumping mechanism, while retaining at least one item during transport, the caddy comprising:
   a housing, the housing defined by at least one front compartment, at least one rear compartment, and at least one side compartment, the at least one side compartment having at least one side compartment depression;
   at least one lid, the at least one lid defined by at least one lid slot and at least one lid depression, the at least one lid configured to enable access to the at least one front compartment, the at least one rear compartment, and the at least one side compartment;
   at least one mounting member, the at least one mounting member disposed to extend from the housing, the at least one mounting member configured to form a substantially U-shaped grip;
   a mobile portion, the mobile portion configured to enable transport of the housing;
   a lever, the lever configured to provide a surface for manipulating the housing;
   a fluid compartment, the fluid compartment defined by a cavity;
   a pump tube, the pump tube disposed to extend into the cavity of the fluid container, the pump tube configured to enable air into the cavity of the fluid compartment, wherein the air generates pressure in the cavity of the fluid compartment;
   a sealing member, the sealing member disposed at the junction between the pump tube and the fluid compartment, the sealing member configured to help restrict the pressurized air from escaping out of the cavity of the fluid compartment;
   a pump handle, the pump handle disposed to operatively connect to the pump tube, the pump handle configured to force the air through the pump tube;
   a tube adapter, the tube adapter disposed to pass through the fluid compartment, the tube adapter configured to help release the pressurized air from the cavity of the fluid compartment; and
   a fluid discharge tube, the fluid discharge tube configured to enable directional dispensing of at least the pressurized air from the cavity of the fluid compartment.

2. The caddy of claim 1, wherein the housing comprises a front end and a rear end.

3. The caddy of claim 1, wherein the housing has a generally rectangular shape.

4. The caddy of claim 1, wherein the housing is constructed from a rigid material.

5. The caddy of claim 4, wherein the rigid material includes at least one member selected from the group consisting of: a rigid polymer, metal, metal alloys, wood, and fiberglass.

6. The caddy of claim 5, wherein the at least one front compartment, the at least one rear compartment, and the at least one side compartment are configured to store, organize, and enable facilitated dispensing of at least one item.

7. The caddy of claim 6, wherein the at least one side compartment is disposed at the rear end of the housing.

8. The caddy of claim 7, wherein the at least one item includes at least one member selected from the group consisting of: a lawn care tool, a construction tool, a communication device, a toy, a weapon, a chemical, a food, a drink, and a container.

9. The caddy of claim 8, wherein the at least one lid hingedly joins the at least one front compartment and the at least one rear compartment.

10. The caddy of claim 9, wherein the mobile portion comprises a wheel and axle.

11. The caddy of claim 10, wherein the lever is configured to extend from the front end of the housing.

12. The caddy of claim 11, wherein the lever comprises a terminus handle.

13. The caddy of claim 12, wherein the fluid compartment is configured to contain a fluid.

14. The caddy of claim 13, wherein the fluid includes at least one member selected from the group consisting of: water, pesticide, fertilizer, chlorine, gel, and a chemical composition.

15. The caddy of claim 14, wherein the pump handle is configured to enable a hand to grip and perform a pumping motion.

16. The caddy of claim 15, wherein the sealing member is a rubber gasket.

17. The caddy of claim 16, wherein the fluid compartment is disposed below the at least one front compartment and the at least one rear compartment.

18. The caddy of claim 17, further including a cavity outlet tube, the cavity outlet tube disposed in the cavity of the fluid compartment, the cavity outlet tube configured to feed the fluid and the pressurized air to the fluid discharge tube.

19. The caddy of claim 18, further including a dispensing head, the dispensing head configured to form a terminus for the fluid discharge tube.

20. A multi-purpose utility caddy for dispensing a fluid trough a pumping mechanism, while retaining at least one item during transport, the caddy comprising:
   a housing, the housing defined by at least one front compartment, at least one rear compartment, and at least one side compartment, the at least one side compartment having at least one side compartment depression;
   at least one lid, the at least one lid defined by at least one lid slot and at least one lid depression, the at least one lid configured to enable access to the at least one front compartment, the at least one rear compartment, and the at least one side compartment;
   at least one mounting member, the at least one mounting member disposed to extend from the housing, the at least one mounting member configured to form a substantially U-shaped grip;
   a wheel and axle, the wheel and axle configured to enable transport of the housing;
   a lever, the lever defined by a terminus handle, the lever disposed to extend form the front end of the housing, the lever configured to provide a surface for manipulating the housing;
   a fluid compartment, the fluid compartment defined by a cavity;
   a pump tube, the pump tube disposed to extend into the cavity of the fluid container, the pump tube configured to enable air into the cavity of the fluid compartment, wherein the air generates pressure in the cavity of the fluid compartment;

a sealing member, the sealing member disposed at the junction between the pump tube and the fluid compartment, the sealing member configured to help restrict the pressurized air from escaping out of the cavity of the fluid compartment;

a pump handle, the pump handle disposed to operatively connect to the pump tube, the pump handle configured to force the air through the pump tube;

a tube adapter, the tube adapter disposed to pass through the fluid compartment, the tube adapter configured to help release the pressurized air from the cavity of the fluid compartment;

a fluid discharge tube, the fluid discharge tube configured to enable directional dispensing of at least the pressurized air from the cavity of the fluid compartment;

a cavity outlet tube, the cavity outlet tube disposed in the cavity of the fluid compartment, the cavity outlet tube configured to feed the fluid and the pressurized air to the fluid discharge tube; and a dispensing head, the dispensing head configured to form a terminus for the fluid discharge tube.

* * * * *